United States Patent Office
2,964,498
Patented Dec. 13, 1960

2,964,498

POLYTHENE AND POLYPROPYLENE STABILIZED WITH A BIS[ORTHO(1,1,3,3-TETRAMETHYLBUTYL) PHENOL] SULPHIDE

Michael Taylor, Norton-on-Tees, England, assignor to Imperial Chemical Industries Limited, London, England, a corporation of Great Britain No Drawing. Filed Mar. 11, 1959, Ser. No. 798,580

Claims priority, application Great Britain Mar. 24, 1958

8 Claims. (Cl. 260—45.95)

This invention relates to new compositions, and in particular to compositions containing a polymer of an unsaturated hydrocarbon and an antioxidant.

It is an object of the invention to provide a composition comprising a hydrocarbon polymer stabilized against oxidative degradation, particularly against oxidative cross-linking, colour change, and deterioration in electrical and physical properties, which are liable to occur during thermal processing and subsequent service life.

It has previously been proposed to use various bis(alkylated phenol) sulphides as stabilizers for rubber and synthetic polymeric materials. I have now found that the sulphides of o-(1,1,3,3-tetramethylbutyl) phenol are particularly effective as stabilizers for hydrocarbon polymers against oxidative degradation.

In accordance with the present invention, therefore, a new composition comprises a polymer of an unsaturated hydrocarbon and, as a stabilizer therefor, a bis(ortho(1,1,3,3-tetramethylbutyl) phenol) sulphide.

The stabilizer preferred for ease of preparation and for effectiveness as an antioxidant is bis(3-(1,1,3,3-tetramethylbutyl)-4-hydroxy phenyl) sulphide, but the sulphide group may occupy a position ortho- or meta- to the hydroxyl group. It is within the scope of the invention to use such mixtures of the sulphides as may be formed by usual methods of preparation. The reaction between ortho(1,1,3,3-tetramethylbutyl) phenol and sulphur monochloride or sulphur dichloride provides a particularly convenient method for preparing the stabilizers; this reaction gives a product having the sulphur linkage mainly in the position para- to the hydroxyl groups. A further method is provided by the reaction of sulphur with the alkylated phenol. The sulphide is preferably a monosulphide, but the disulphides are also effective.

The invention is of particular value in its application to the stabilization of polythene and polypropylene against oxidative degradation. The stabilizers used have advantages over previously known stabilizers. They combine the properties of being extremely effective antioxidants (that is, of protecting the polymer for long periods of time in air and water at high temperatures) with completely non-staining properties under the conditions to which, for example, a polythene/antioxidant mix would be subjected in practical use. In particular, we have found that bis(ortho(1,1,3,3-tetramethylbutyl) phenol) sulphide protects polythene for longer periods in air and water than bis(2-methyl-4-hydroxy-5-tert-butyl phenyl) sulphide, also a non-staining antioxidant. The stabilizer also shows the property of reinforced stabilizing activity in the presence of carbon black.

The stabilizers may be incorporated with the polymer by any of the methods generally employed. For example: they may be mixed as such with the polymer on friction mills, in Banbury type internal mixers, or in extruders; or they may be used in the form of a masterbatch containing the stabilizer in relatively high concentration in the polymer, and mixed with more polymer by methods as described; or they may generally be added to the reactants during polymerisation of the monomer; or a solution of the stabilizer in a hydrocarbon solvent may be stirred into the solid polymer in granular or powdered form, and the solvent removed after the solution has become uniformly distributed.

The amounts of stabilizer required to give protection to the polymer will depend upon the condition to which the polymer is to be exposed, and upon the presence or absence of other components in the compositions; it is generally within the range of 0.0005% to 2% by weight of the polymer. Much higher proportions may be incorporated in the polymer in the production of master batches for mixing with untreated polymer, this being a particularly convenient method of obtaining uniform dispersion of the stabilizer. For polythene, amounts of stabilizer ranging from 0.001% to 0.2% in the finally treated polymer are usually preferred, according to the purpose for which the composition is being prepared. For polypropylene, the preferred amount is generally from 0.02% to 1.0%.

My invention is illustrated but in no way limited by the following examples, in which parts given are by weight.

Example 1

Ortho(1,1,3,3-tetramethyl butyl) phenol was treated with sulphur dichloride to give bis(ortho(1,1,3,3-tetramethylbutyl) phenol) sulphide, which was purified by recrystallization. Spectroscopic examination was believed to indicate that the sulphur atom of the sulphide was linked to the para-position of each benzene ring.

0.1% of the sulphide was added to a sample of polythene produced by a high-pressure process and the sample was milled in air between rolls having a nip setting of 0.06 inch and a roll speed ratio of 1:1.2. The roll temperature was 160°±5° C. Samples of the milled product were taken at given intervals; these samples, which were colourless, were pressed into the form of discs, and the power factors were determined by the method of British Standard Specification 2067:1953 at a temperature of 20° C. and a frequency of 16 mcs./sec.

The results obtained are given in the following table, and are compared with the results obtained under the same conditions with a sample of the same polythene containing no antioxidant.

| | Power factor ($\tan\sigma \times 10^4$) after milling for— | | | |
|---|---|---|---|---|
| | 10 mins. | 1 hr. | 2 hrs. | 3 hrs. |
| Polythene | 2 | 7 | 23 | 31 |
| Polythene + 0.1% by weight of the sulphide. | 2 | 2 | 2 | 2 |

Example 2

The following experimental results demonstrate the effect of bis(ortho(1,1,3,3-tetramethylbutyl) phenol sulphide on the stability of isotactic polypropylene having a melting point range 160°–170° C. when determined on a hot stage microscope. The stabilizer was milled into the polymer in an open mill at 170° C.

Sheets 0.020 inch thick were prepared from polypropylene containing various percentages by weight of the sulphide and the time for embrittlement in air at 150° C. was determined. The sheets were clear and shiny.

| Percent sulphide | 0.1 | 0.2 | 0.5 | 1.0 |
|---|---|---|---|---|
| Time for embrittlement (hours) | 150 | 150 | 250 | 300 |

A similar sheet of polypropylene containing no antioxidant was embrittled by heating at 150° C. for 5 hours in air.

Similar sheets of polypropylene containing 1% by weight of the sulphide were heated at 150° C. for 50 hours or exposed to ultra-violet light for 25 hours. Neither treatment caused more than a very slight discolouration of the sheet.

*Example 3*

A sample of polythene containing 0.1% of bis(ortho(1,1,3,3-tetramethylbutyl) phenyl) sulphide was heated at 160° C. in air. The degree of oxidation was then assessed on the sample, which was in the form of sheet 0.010" thick, by the determination of the carbonyl group content by means of the infrared spectrometer. When the optical density for this absorption reached 1, then the oxidation had reached a stage beyond which it proceeded very rapidly. The sample containing 0.1% of bis(ortho(1,1,3,3-tetramethylbutyl) phenol) sulphide reached this stage in 38 hours, whereas a sample containing 0.1% of bis(2-methyl-4-hydroxy-5-tert-butyl phenyl) sulphide reached this stage after only 21 hours.

When the same tests were carried out with 1% channel type carbon black added to the polythene in each case, the period of protection was extended to 78 hours in the case of the sample containing bis(ortho(1,1,3,3-tetramethylbutyl) phenyl) sulphide and to 59 hours in the case of the sample containing bis(2-methyl-4-hydroxy-5-tert-butyl phenyl) sulphide. The antioxidant effect was therefore reinforced in each case by 30 hours.

*Example 4*

A sample of polythene containing 0.1% of bis(ortho(1,1,3,3-tetramethylbutyl) phenyl) sulphide was heated in air at 105° C. The power factor was still below $10 \times 10^4$ (tan δ) after 5,000 hours. A sample containing 0.1% of bis(2-methyl-4-hydroxy-5-tert-butyl phenyl) sulphide had reached this level in 3,000 hours. When a sample of polythene has been oxidized to the extent of having a power factor of $10 \times 10^4$, the rate of deterioration becomes very rapid and this power factor is usually taken as the limit of oxidation permissible.

When similar tests were carried out in water at 93° C. bis(ortho(1,1,3,3 - tetramethylbutyl) phenyl) sulphide gave protection for 2,100 hours compared with 1,150 hours for bis(2-methyl-4-hydroxy-5-tert-butyl phenyl) sulphide.

*Example 5*

The effect of antioxidant on the rate of uptake of oxygen by polythene at 140° C. was determined. The arbitrary limit of 1 cc. of oxygen per gramme of polythene was selected as the limit after which oxidation took place very rapidly, and therefore considered to be the extent to which oxidation was permissible by this method of test. 0.1% of bis(ortho(1,1,3,3-tetramethylbutyl) phenyl) sulphide protected polythene for 102 hours compared with 96 hours for bis(2-methyl-4-hydroxy-5-tert-butyl phenyl) sulphide. When however the tests were carried out in the presence of carbon black, the periods of protection were extended to 256 and 150 hours respectively. Thus, under these conditions, the protection given by bis(ortho(1,1,3,3-tetramethylbutyl) phenyl) sulphide is substantially greater than that given by bis(2-methyl-4-hydroxy-5-tert-butyl phenyl) sulphide. The reinforcing effect produced by carbon black is much greater in the case of the former stabilizer than it is for the latter.

I claim:

1. A composition comprising a polymer selected from the group consisting of polythene and polypropylene and, as a stabilizer therefor, a bis(ortho(1,1,3,3-tetramethylbutyl) phenol) sulphide.

2. A composition as claimed in claim 1 in which the sulphide is a monosulphide.

3. A composition as claimed in claim 1 in which the sulphide is bis(3-(1,1,3,3-tetramethylbutyl)-4-hydroxyphenyl) sulphide.

4. A composition as claimed in claim 1 in which the polymer is polythene.

5. A composition as claimed in claim 1 in which the polymer is polypropylene.

6. A composition as claimed in claim 1 that contains from 0.0005% to 2% of the stabilizer, by weight of the polymer.

7. A composition as claimed in claim 4 that contains from 0.001 to 0.2% of the stabilizer, by weight of the polythene.

8. A composition as claimed in claim 5 that contains from 0.02% to 1.0% of the stabilizer, by weight of the polypropylene.

References Cited in the file of this patent

UNITED STATES PATENTS

| | | |
|---|---|---|
| 2,160,172 | Rosen et al. | May 30, 1939 |
| 2,700,691 | Mayes | Jan. 25, 1955 |

FOREIGN PATENTS

| | | |
|---|---|---|
| 571,943 | Great Britain | Sept. 17, 1945 |
| 201,160 | Australia | Apr. 28, 1955 |
| 772,938 | Great Britain | Apr. 17, 1957 |